United States Patent

Meissner et al.

[11] Patent Number: 6,067,874
[45] Date of Patent: May 30, 2000

[54] ACTUATING ARRANGEMENT FOR A BOWDEN CABLE

[75] Inventors: Klaus Meissner, Braunschweig; Frank Bekemeier, Rethen; Dieter Meyer, Wolfsburg, all of Germany

[73] Assignee: Volkswagen AG, Wolfsburg, Germany

[21] Appl. No.: 09/089,072

[22] Filed: Jun. 2, 1998

[30]    Foreign Application Priority Data

Jun. 4, 1997 [DE]  Germany ............................ 197 23 376

[51] Int. Cl.[7] ................................ F16C 1/10; G05G 5/06; B25G 3/18
[52] U.S. Cl. ............................ 74/502.2; 74/489; 74/528; 403/326
[58] Field of Search ................................ 74/500.5–502.6, 74/489, 527, 531, 528; 403/326

[56]              References Cited

U.S. PATENT DOCUMENTS

| | | |
|---|---|---|
| 3,828,624 | 8/1974 | Wiegand . |
| 4,007,645 | 2/1977 | Dove et al. . |
| 4,013,155 | 3/1977 | Olsen . |
| 4,667,459 | 5/1987 | Scanland et al. ........................ 56/11.3 |
| 5,131,785 | 7/1992 | Shimazaki . |
| 5,191,866 | 3/1993 | Tosdale ............................ 74/502.4 X |
| 5,277,080 | 1/1994 | Roelle ............... 74/501.5 R |
| 5,564,311 | 10/1996 | Chen ........................................ 74/489 |
| 5,662,004 | 9/1997 | Osborn et al. ........................ 74/502.4 |
| 5,678,665 | 10/1997 | Debreczeni ........................ 74/502.4 X |
| 5,934,149 | 8/1999 | Tuda ..................................... 74/502.2 |

FOREIGN PATENT DOCUMENTS

| | | |
|---|---|---|
| 0083451 | 7/1983 | European Pat. Off. . |
| 0086717 | 8/1983 | European Pat. Off. ............. 74/502.4 |

*Primary Examiner*—Vinh T. Luong
*Attorney, Agent, or Firm*—Baker Botts L.L.P.

[57]                  ABSTRACT

An actuating arrangement for a Bowden cable, in particular in a vehicle, includes a bracket which can be fastened to a wall and a lever arrangement which is pivotally fastened to the bracket and includes a lever member and a cable coupling for one end of the Bowden cable. To provide improved installation conditions and a concealed arrangement of the Bowden cable, the lever member and the cable connector are separate parts which can be connected to each other in a rotationally fixed relation after the assembly consisting of the bracket and cable coupling has been fastened to the wall.

13 Claims, 3 Drawing Sheets

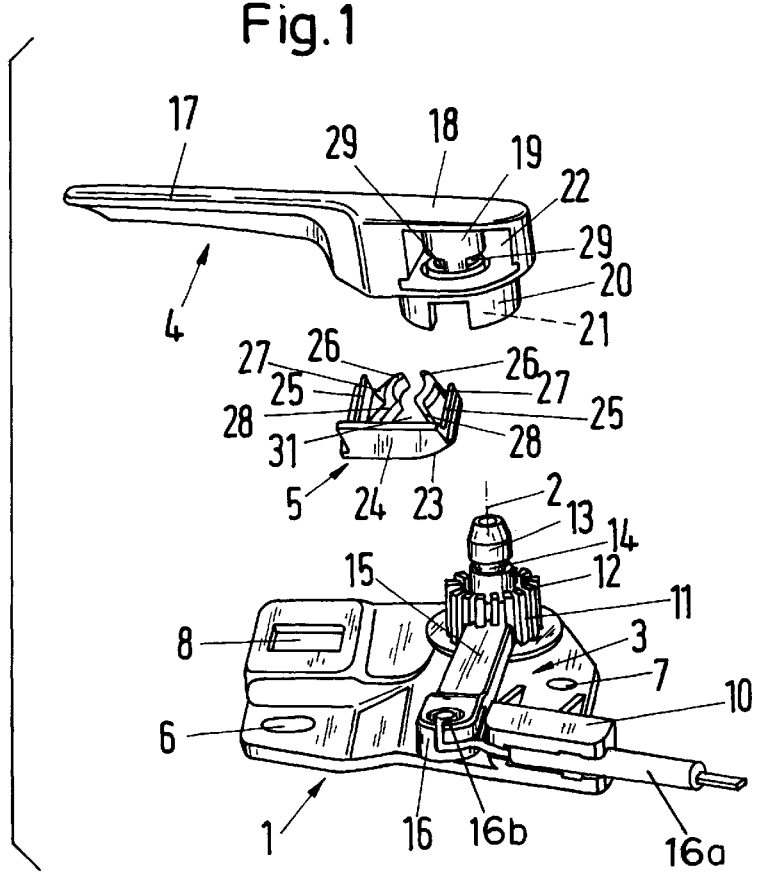
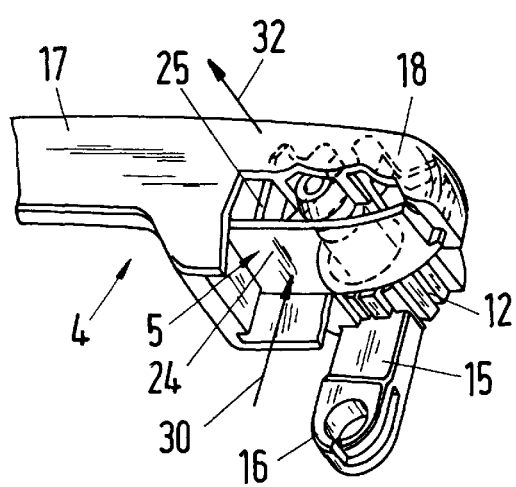
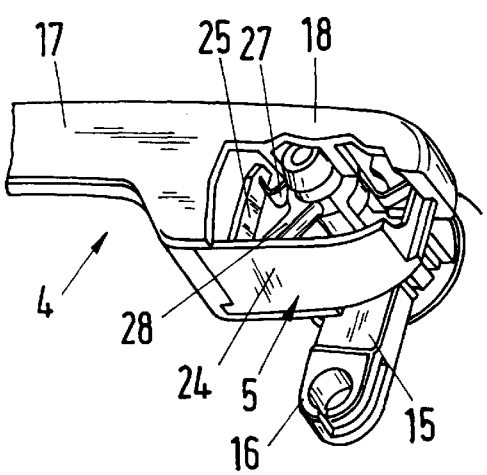

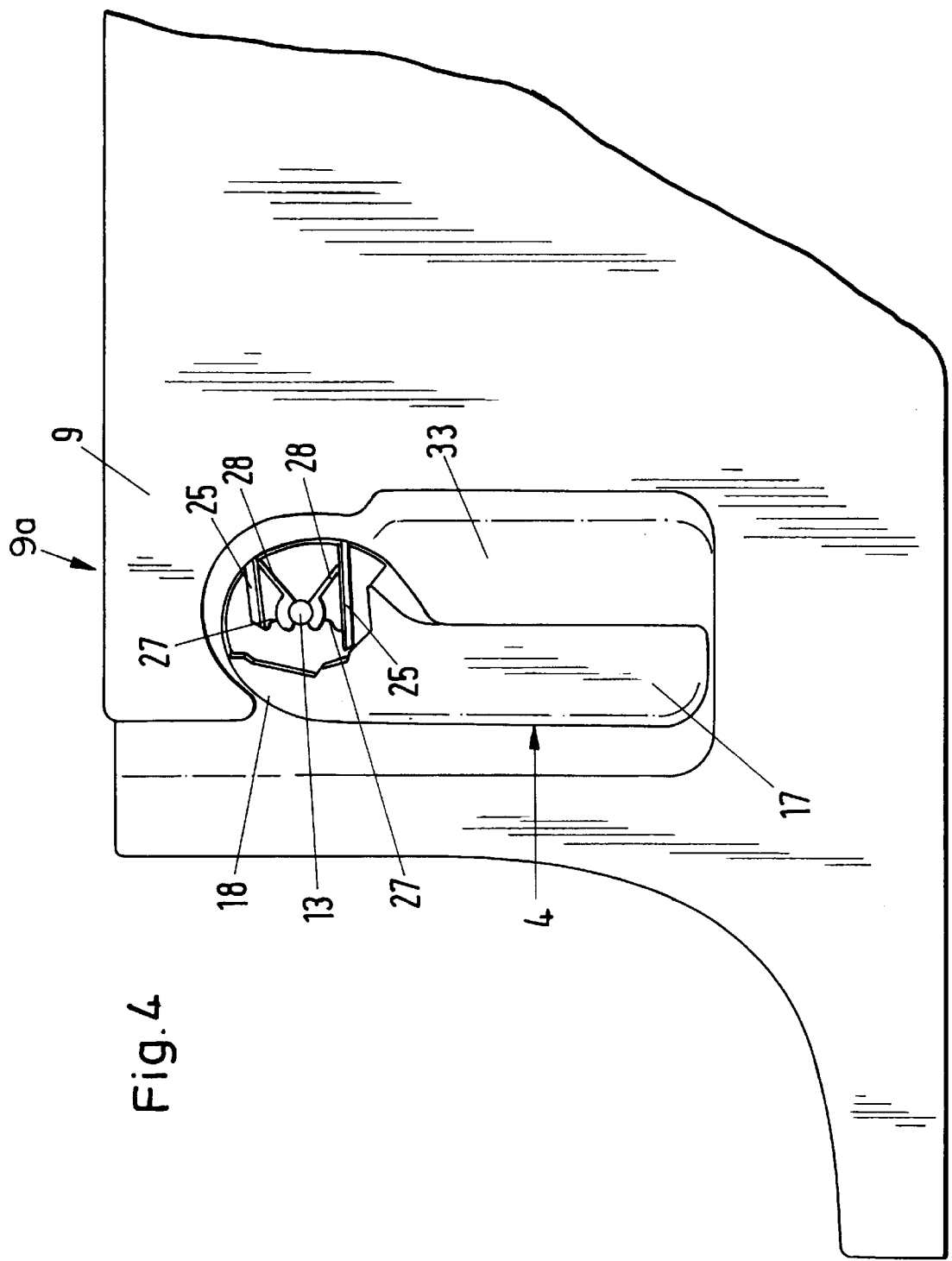

ACTUATING ARRANGEMENT FOR A BOWDEN CABLE

BACKGROUND OF THE INVENTION

This invention relates to actuating arrangements for Bowden cables.

Bowden cables are provided, for example, in automobiles to enable the locking of the hinged cover of the engine compartment or baggage compartment to be released from inside the passenger space. A Bowden cable actuating arrangement often has a bracket mounted on the side wall of the foot space of the driver from which the Bowden cable extends to the lock of the hinged cover. The lock is released through the Bowden cable by pivoting a lever from its inoperative position into a release position against the force of restoring spring.

In conventional Bowden cable actuating arrangements, a cable connection is integrated in the release lever to provide a one-piece lever and cable coupling. The lever is pivotally connected to the mounting bracket from the rear side so that the pivot screw is not visible in the installed condition. Two fastening holes are provided in the bracket so that the actuating arrangement assembly consisting of the bracket and the lever is fastened to the vehicle body with two screws.

This conventional actuating arrangement, i.e. the unit consisting of a mounting bracket and a combined lever and cable coupling is ruggedly constructed so that it sometimes projects into the passenger space and gets in the way. In addition, not only are the fastening screws visible, but the Bowden cable itself, or at least the portion of it which is fastened to the lever, is also visible. These factors may have an adverse visual effect, especially in vehicles which are designed to a superior appearance standard.

SUMMARY OF THE INVENTION

Accordingly, it is an object of the present invention to provide an actuating arrangement for a Bowden cable which overcomes disadvantages of the prior art.

Another object of the invention is to provide a Bowden cable actuating arrangement having an improved visual appearance.

These and other objects of the invention are attained by providing a Bowden cable actuating arrangement which includes a mounting bracket to be fastened to a vehicle wall, a cable coupling which is pivotally supported from the mounting bracket, a lever member for operating the actuating arrangement, and a connection for releasably connecting the cable coupling and the lever in rotationally fixed relation after the mounting bracket and the cable coupling have been mounted on a vehicle wall.

BRIEF DESCRIPTION OF THE DRAWINGS

Further objects and advantages of the invention will be apparent from a reading of the following description in conjunction with the accompanying drawings, in which:

FIG. 1 is an exploded perspective view illustrating a representative embodiment of an actuating arrangement for a Bowden cable according to the invention;

FIG. 2 is a perspective view showing the actuating arrangement of FIG. 1 in the assembled condition without the bracket with a locking element show in its locking position;

FIG. 3 is a view similar to FIG. 2 but with the locking element shown in its unlocking position;

FIG. 4 is a side view of a wall of a passenger compartment with the actuating arrangement installed and the actuating lever in the locked position.

DESCRIPTION OF PREFERRED EMBODIMENTS

Figure 5:
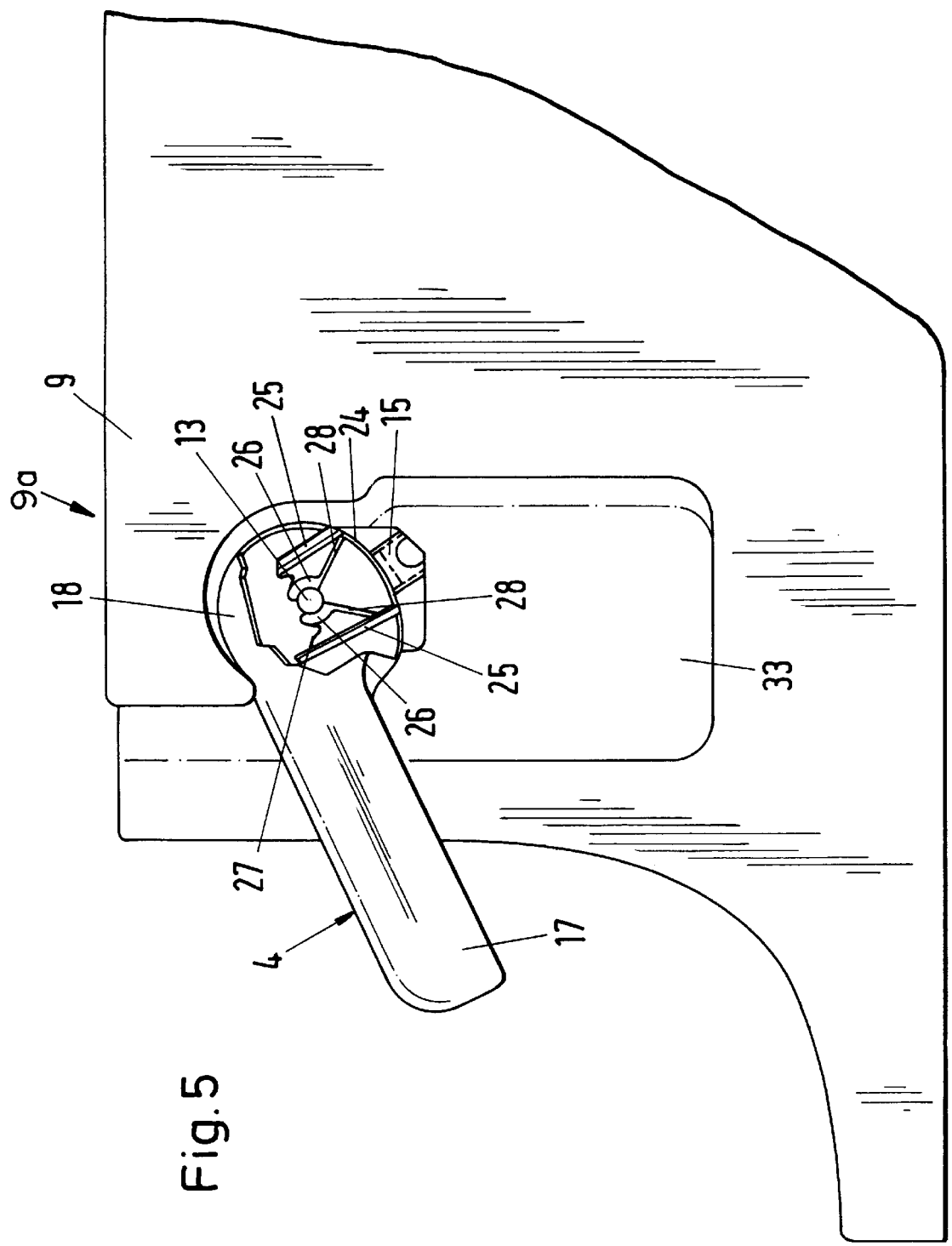
FIG. 5 is a view similar to FIG. 4 showing the actuating lever in the release position.

In the typical embodiment of the actuating arrangement illustrated in FIG. 1, the essential parts are shown in exploded view so that they are easier to recognize. In this arrangement, a bracket 1 designed to be fastened to a body plate, for example to the A-column of a motor vehicle, carries a pivotally supported cable coupling 3 for a Bowden cable 10a which can pivot on the bracket 1 about an axis 2. In addition, the actuating arrangement includes a lever 4, which is likewise pivotable about the axis 2 and can be connected to the cable coupling 3 in rotationally fixed relation, and a locking element 5 for locking the connection between the cable coupling 3 and the lever 4.

The bracket 1 has two holes 6 and 7, at least one of which is an elongated hole, for a screwed connection to the vehicle body, as well as a recess 8, into which wall paneling 9, which will be described in more detail below, is clipped. A further hole in the bracket 1 (which cannot be seen in the drawing) is for a screw providing the pivot mounting of the cable coupling 3 to the bracket 1. Because that screw is inserted through the rear of the bracket, this connection must be effected before the bracket 1 is fastened to the body. A guide and supporting part 10 for the Bowden cable 16a is integrally formed on the base plate of the bracket 1.

The cable coupling 3 includes a cylindrical driver 12 which has a splined periphery 11 and from which a pin 13 having an undercut 14 projects concentrically. The common axis of driver 12 and the pin 13 coincides with the pivot axis 2 of the coupling member. The cable coupling 3 also includes an arm 15 integrally forming an axial 5extension on the driver 12 and having a free end 16 designed receive one end 16b of the Bowden cable.

The lever 4 includes a handle part 17 and a head part 18 which has a push-in connection with the pin 13 and the driver 12. To this end, the head part 18 has a guide sleeve 19 which receives the pin 13 and a section 20 which has a spined internal profile 21 to mate with the splined profile 11 of the driver 12.

The head part 18 has a recess 22 in one side wall into which the locking element 5 can be pushed. The locking element 5 comprises a U-shaped body 23 having a base 24 and two legs 25, between which a pair of catch elements 26 is integrally formed on the body 23 in an elastic manner by front and rear webs 27 and 28. When the locking element 5 is pushed into the assembly consisting of the lever 4 the bracket 1 and the cable coupling 3, the catch elements 26 pass through two recesses 29 in the guide sleeve 19, are pressed apart slightly in the process, and are then resiliently positioned in the undercut 14 on the pin 13 when the locking element 5 is pushed in farther. In this locking position of the locking element 5, the outer surface of the base 24 conforms to the contour of the head part 18, as shown in FIG. 2, and removal of the lever 4 by pulling it off in the axial direction is not possible. If the locking element 5 is pushed in farther, in the direction of the arrow 30 in FIG. 3, the catch connection is unlocked and the pin 13 is then located in a region 31 which is located between the rear webs 28 and the base 24 and is large enough so that the pin 13 is freely movable therein in the axial direction. In this position of the locking element 5, the lever 4 can be pulled off in the direction shown by the arrow 32 in FIG. 3. Unlocking of the lever may also be accomplished by moving the locking element 5 from the locking position shown in FIG. 2, out of the head part 18 in the opposite direction from the arrow 30 in FIG. 3. By this motion, the connection between the catch elements 26 and the pin 13 is also released, and the lever 4 can be removed when required by pulling it off in the direction of arrow 32.

For the purpose of removing the locking element 5, the base 24 of its body 23 is dimensioned in such a way that its height is a few millimeters less than the height of the recess 22 in which it is received in the head part 18. In this way, an open space is provided between the top edge of the base 24 and the top edge of the recess 22 through which the base 24 can be pulled from behind, if need be with a suitable tool, and the locking element 5 can be displaced in the direction opposite from the arrow 30 in FIG. 3.

FIGS. 4 and 5 show the actuating arrangement installed in a wall 9a of a vehicle. In this condition, all the essential components of the actuating arrangement except for the actuating lever 4 are concealed by the wall paneling 9 which is fastened to the vehicle Acolumn as mentioned above. The lever 4 is shown in the closed position in FIG. 4 and in the release position in FIG. 5. In the closed position, the lever 4 is disposed in a gripping hollow 33 of the wall paneling 9 so that it is flush with the wall surface. It can be seen from the cut-away region of the head part 18 how the pair of catch elements 26 enclose the pin 13, thus ensuring the locking of the push-in connection.

In the release position of the actuating lever 4, and only in this position, the locking element 5 can be displaced from its locking position shown in FIG. 5 into an unlocking position, either by pressing the locking element 5 in further, as a result of which the pin 13 is positioned in the region 31, or by pulling the locking element 5 out of the recess, as a result of which the connection between the pin 13 and the catch elements 26 is likewise eliminated. In the closed position of the lever 4 shown in FIG. 4, the locking element 5 is inaccessible because it is concealed behind the adjacent boundary region of the gripping hollow 33.

Although the invention has been described herein with reference to specific embodiments, many modifications and variations therein will readily occur to those skilled in the art. Accordingly, all such variations and modifications are included within the intended scope of the invention.

We claim:

1. An actuating arrangement for a Bowden cable comprising a bracket arranged to be fastened to a wall, a cable coupling for one end of the Bowden cable pivotally supported from the bracket and having a driver, an actuating lever having an actuating handle, and a connecting member for connecting the cable coupling and the actuating lever in a rotationally fixed relation after the bracket and the cable coupling pivotally supported therefrom has been fastened to a wall wherein the actuating lever includes a portion of the actuating handle having a round profile and wherein the driver and the portion of the handle with the round profile have splined interengaging faces to provide a push-in connection.

2. An actuating arrangement according to claim 1 wherein the connecting member cooperates with the actuating lever and the cable coupling to provide a rotationally fixed push-in connection.

3. An actuating arrangement according to claim 2 wherein a section of the actuating lever having a non-circular cross-section and a portion of the cable coupling having a corresponding mating cross-section cooperate to provide a push-in connection.

4. An actuating arrangement according to claim 3 wherein the connecting member comprises an axially effective locking element for the push-in connection.

5. An actuating arrangement according to claim 4 wherein the connecting member has a U-shaped body containing two spaced catch elements which face each other and are elastically compliant to permit an increase in the spacing between the catch elements, the catch elements being connected by front and rear webs to corresponding legs of the U-shaped element, wherein the catch elements elastically enclose an undercut on a pin integrally formed on the cable coupling in the locked condition of the locking element.

6. An actuating arrangement according to claim 5 wherein the pin has in an axis which coincides with a pivot axis of the cable coupling.

7. An actuating arrangement according to claim 5 wherein the rear webs and a base of the U-shaped element define a region having a cross section greater than the largest cross section of a free end region of the pin.

8. An actuating arrangement according to claim 5 including a guide sleeve which is integrally formed on the lever member and into which the pin is received when the locking element is inserted.

9. An actuating arrangement according to claim 8 wherein the guide sleeve includes recesses in its periphery in order to receive the locking element.

10. An actuating arrangement according to claim 5 wherein, in the locked position of the locking element, the contour of a base of the connecting member coincides with the contour of the lever member in the region of a recess which the connecting member is received.

11. An actuating arrangement according to claim 10 wherein the base of the connecting member fills the recess in the lever except for a gap.

12. An actuating arrangement according to claim 11 wherein the connecting member has an inner surface accessible through the recess by which the connecting member can be pulled out of the lever member to unlock the locking element.

13. An actuating arrangement according to claim 12 wherein the inner surface is at an edge of a wall portion of the connecting member which is adjacent to the gap.

* * * * *